US 7,570,665 B2

(12) United States Patent  
Ertel et al.

(10) Patent No.: US 7,570,665 B2  
(45) Date of Patent: Aug. 4, 2009

(54) GENERATION OF MIXED MEDIA STREAMS

(75) Inventors: Emilian Ertel, Nuremberg (DE); Armin Schlereth, Baiersdorf (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 728 days.

(21) Appl. No.: 10/517,721

(22) PCT Filed: Jun. 11, 2002

(86) PCT No.: PCT/EP02/06400

§ 371 (c)(1),  
(2), (4) Date: Jul. 21, 2005

(87) PCT Pub. No.: WO03/105484

PCT Pub. Date: Dec. 18, 2003

(65) Prior Publication Data

US 2006/0156217 A1 Jul. 13, 2006

(51) Int. Cl.  
*H04J 3/06* (2006.01)
(52) U.S. Cl. .................... 370/503; 370/541; 715/202
(58) Field of Classification Search ............. 715/500.1, 715/202; 370/395.63, 395.64, 465, 466, 370/474, 535–539, 503, 541  
See application file for complete search history.

(56) References Cited

U.S. PATENT DOCUMENTS

| 5,515,490 | A  |   | 5/1996  | Zellweger et al. |
|-----------|----|---|---------|------------------|
| 5,611,039 | A  |   | 3/1997  | Nobori et al.    |
| 5,661,665 | A  |   | 8/1997  | Green et al.     |
| 5,777,612 | A  |   | 7/1998  | Kataoka          |
| 6,751,238 | B1 | * | 6/2004  | Lipp et al. ................... 370/541 |
| 7,136,398 | B1 | * | 11/2006 | Huart et al. .................. 370/503 |

FOREIGN PATENT DOCUMENTS

| EP | 0 944 249 A  | 9/1999  |
| WO | WO 97 46027 A | 12/1997 |
| WO | WO 9746027   | 12/1997 |

OTHER PUBLICATIONS

Patent Abstracts of Japan vol. 018, No. 567 (P-1820), Oct. 28, 1994 & JP 06 208361 A (S R Soken KK;Others:02), Jul. 26, 1994 abstract.
Herng-Yow Chen et al: "Multisync: A Synchronization Model for Multimedia Systems" IEEE Journal on Selected Areas in Communications, IEEE Inc. New York, US vol. 14, No. 1, 1996, pp. 238-248, XP000548825 ISSN: 0733-8716 p. 238, left-hand column, paragraph 1—p. 240, left-hand column, last paragraph; figures 2, 3.

* cited by examiner

*Primary Examiner*—Brenda Pham  
*Assistant Examiner*—Sai-Ming Chan (57) ABSTRACT

To achieve coordination during generation of a plurality of mixed media streams, there is suggested a method of generating a mixed media stream (62-64) from input media streams (40-50) having payload data elements and related identifiers. The method comprises the step (S12) of aligning the input media streams (40-50) according to a pre-specified relation between identifiers in different input media streams (40-50) before generating the mixed media stream.

11 Claims, 7 Drawing Sheets

Master mixer s1 = 2   i1 = 1 s2 = 4   i2 = 4 s3 = 5   i5 = 7

Slave mixer q1 = 2   n1 = 2 q2 = 5   n2 = 1 q3 = 4   n3 = 5 q4 = 10  n4 = 2

| 9 | 8 | 7 | 6 | 5 | 4 | 3 | 2 |
|---|---|---|---|---|---|---|---|
| 8 | 7 | 6 | 5 | 4 | 3 | 2 | 1 |
| 12 | 11 | 10 | 9 | 8 | 7 | 6 | 5 |
| 9 | 8 | 7 | 6 | 5 | 4 | 3 | 2 |

Fig. 7

GENERATION OF MIXED MEDIA STREAMS

FIELD OF INVENTION

The present invention relates to the generation of mixed media streams from input media streams having payload data elements and related identifiers, and in particular considering a relation between different media streams during generation of a mixed media stream.

BACKGROUND ART

Mixed media streams are generated in communication networks, e.g., when mixing audio signals and video signals during a video conference. Here, it is important that mixed audio signals are matched to the related mixed video signal because otherwise the speech will not be lip-synchronous to the video stream. The same problem also arises with other streams than audio or video streams, e.g., text streams having alphanumeric signs when using subtitles.

Currently, the matching of such video and audio or in more general sense mixed media streams require a complicated procedure. Normally, time stamps are used, which will be attached to the different signals to enable the matching of the related media streams. However, while this at least is some mechanism to a match the mixing of different media streams, currently, there does not exist any solution to the problem how the generation of mixed media streams of a different type, e.g., a mixed video stream and a mixed audio stream, may be coordinated.

SUMMARY OF INVENTION

In view of the above, the object of the present invention is to provide a mechanism for coordination during generation of a plurality of mixed media streams.

According to the present invention, this object is achieved through a method of generating a mixed media stream from input media streams having payload data elements and related identifiers, wherein the input media streams are aligned according to a pre-specified relation between identifiers in different input media streams before generating the mixed media stream.

In the sense of the present invention a media stream is generated in a packet switched transmission process typically by a user end equipment. One example of an input media stream may be a voice data packet stream or a video data packet stream which is generated in a video conference. Another example would be the exchange of media streams over any type of network, e.g., the Internet, an Intranet, an LAN, a WAN or VPN.

Typically, each media stream consists of a plurality of data packets and each data packet has a header part and a payload data part. The header part carries identifiers characterizing a time relationship between different data packets in a single media stream. A single end user equipment generates different media streams—e.g., voice, data, text, sound etc.—and data packets of different type media streams carry the same identifiers when they are generated at the same instance of time.

When different end user equipments generate different media streams of comparable type each such media streams for each end user equipment will then be split between different mixers in the communication systems handling the data packet exchange before mixing of similar type media streams into a mixed media stream and subsequent transmission over the communications network.

The present invention considers the coordination of the operation for different mixers.

To achieve this, it is proposed to add a further step of alignment of different input media streams in time before generating the mixed media stream. The alignment in time is achieved such that a pre-specified relative relation in time between different media streams is achieved.

Here, use is made of identifiers being available in the input media streams. As outlined above, in each media stream there are available identifiers defining an order of data packets in that media stream. The same also applies for all other input media streams which will finally be used to generate a specific mixed media stream.

Therefore, at a certain point in time one may consider a of such identifiers in each input media stream as a relation which may then be compared to a pre-specified relation.

In other words, each such tupel defines a relative alignment of input media streams which may be changed according to a pre-specified relation either through advancing or delaying input media streams in time.

Therefore, the result of the inventive method is a modification of the relative alignment of input media streams according to a pre-specified relation of ordering for the input media streams before generating the mixed media streams. It should be noted that such an alignment is related to the relative alignment of input media streams only and does not rely on absolute time.

According to a preferred embodiment of the present invention the pre-specified relation between identifiers in different input media streams is matched to a relation between identifiers in further input media streams used during generation of a further mixed media stream.

Here, one example could be that the mixing of a first group of input media streams is related to speech data and the mixing of a second group of input media streams is related to video, text, service-related data, etc. Then, what is assured is that the generated first mixed media stream and the generated second mixed media will be generated using the same relative relation between identifiers in the related groups of input media streams. In other words, the generated mixed media streams are generated with the related input media streams being aligned according to the same relative relation between identifiers.

Here, a relation between identifiers in a first mixer—that may also be referred to a master mixer, without limiting scope of invention—may be used for the generation of a further mixed media stream in a second mixer—which may be referred to as slave mixer, without limiting scope of invention.

It should be noted that according to the present invention each type of mixer in the communication network may be operated either as a master mixer or a slave mixer as long as it implements the inventive method.

It should further be noted that according to the present invention a further alternative is that the relation between identifiers from input media streams may be determined in a stand-alone alignment unit provided externally to mixers adapted to generate mixed media streams. Here, the alignment unit would inform the mixers about the relation between identifiers for subsequent processing of input media streams in the mixers.

According to a further preferred embodiment of the present invention, a matching of relations between identifiers in a first group of input media streams and in a further group of input media streams is achieved in an efficient way.

Initially, an intersection between the input media streams and the further input media streams is identified. The purpose of this step is to tackle situations where not every mixer is operating on the same and related number of input media streams.

One such situation may, e.g., occur if different user end equipments participating in a communication session generate different media streams, e.g., a first user end equipment may generate voice data only, a second user end equipment may generate video data only, and a third and fourth user end equipment may generate both voice and video data. In this case, only a coordination of the mixing for media streams of the third and fourth user end equipment may make sense as only here a mutual relative relation between identifiers fixing a relative order data packets in a media stream is available.

According to the preferred embodiment, once such an intersection is identified what follows is the determination of the relation between identifiers in input media streams at a master mixer for subsequent use during mixing of input media streams in a slave mixer.

In a further step, those input media streams in the slave mixer which are comprised in the identified intersection will be aligned according to the relation of identifiers of the input media streams handled by the master mixer.

According to another preferred embodiment of the present invention the method is efficiently implemented through use of a set representation of input media streams. Each group input media stream is characterized by a set of tupels. A first element in each tupel characterizes an input media stream, e.g., through an input media stream number, and a second element in each tupel defines an identifier of the input media stream at a point in time. Thus, the determination of the intersection explained above may be achieved through simple set operations.

A further preferred embodiment of the present invention is particularly suited to a situation where related input media streams in different groups of input media streams are not supplied to corresponding input terminals of different mixers.

Here, one example would be that a first user end equipment generates a first voice media stream and a first media stream and a second user end equipment generates a second voice media stream and a second video media stream. Nevertheless, a situation may occur where at a first mixer handling voice media streams the first and second voice media streams are supplied to the first and second input terminal, while at a second mixer handling video media streams the first video media stream and the second video media stream are supplied to the second and first input terminal, respectively, or in other words, are interchanged.

In this case, it is very useful to re-order the sequence of input media streams and the input terminals either at the master mixer or at the slave mixer because otherwise the alignment procedure outlined above will lead to a non-intended result. Preferably, such a re-ordering may be described using a permutation vector which easily allows to extend the set operations described above for incorporation of the re-ordering into the processing of different groups of input media streams.

Another preferred embodiment of the present invention relates to the way the alignment of input media streams is achieved.

An important aspect of the alignment is the determination of a time delay for each input stream such that—assuming that the time delay is subsequently applied to the input media stream—the relations between the identifiers in the input media streams then correspond to the pre-specified relation of identifiers.

Also, the time delay may be achieved through shifting each input media stream according to the related time delay, e.g., using a buffer memory of suitable size.

Yet another preferred embodiment of the present invention is related to the exchange of information regarding the pre-specified relation between identifiers of different input media streams.

A first way to achieve this exchange is through forwarding a related signal from the master mixer to the slave mixer which signal should comprise at least the relation of identifiers used during generation of a mixed media stream in the master mixer.

Another mechanism suitable for the exchange of tupel between a master mixer and a slave mixer may be a shared memory provided between a master mixer and the slave mixer, where each mixer has access to the shared memory in a time coordinated manner.

Similar advantages as outlined above with respect to the inventive method are also achieved by an inventive apparatus for generating a mixed media stream from input media streams having payload data elements and related identifiers and preferred embodiments thereof.

Further, according to yet another preferred embodiment of the present invention there is provided a computer program product directly loadable into the internal memory of a media mixer comprising software code portions for performing the inventive mixing process when the product is run on the processor of the media stream processor.

Therefore, the present invention is also provided to achieve an implementation of the inventive method steps on computer or processor systems. In conclusion, such implementation leads to the provision of computer program products for use with the computer system or more specifically a processor comprised in, e.g., a media stream mixer.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or telephone networks and/or Internet via modems or other interface devices. It should be understood that such media, when carrying processor readable instructions implementing the inventive concept represent alternate embodiments of the present invention.

DESCRIPTION OF DRAWINGS

In the following preferred embodiments of the present invention will be described with reference to the drawings in which.

DESCRIPTION OF BEST MODE AND PREFERRED EMBODIMENTS OF THE INVENTION

In the following, general reference will be made to the mixing of media streams. Here, it is assumed that each media stream is set up by a sequence of data packets dividing into a header part and a payload part. The header part will comprise identifiers defining a sequential ordering of the data packets. Media stream mixing in the sense of the present invention is related to the reception of a plurality of media streams of a common type and the processing of the plurality of media streams such that only a single media stream of a mixed type according to a specific processing on the input media streams is output. The present invention is well suited for any type of processing on input media streams, e.g., audio streams, video streams, and/or text streams. In other words, the mixing of media streams is not restricted to any type of media streams, e.g., voice, data, text, etc.

Figure 1:
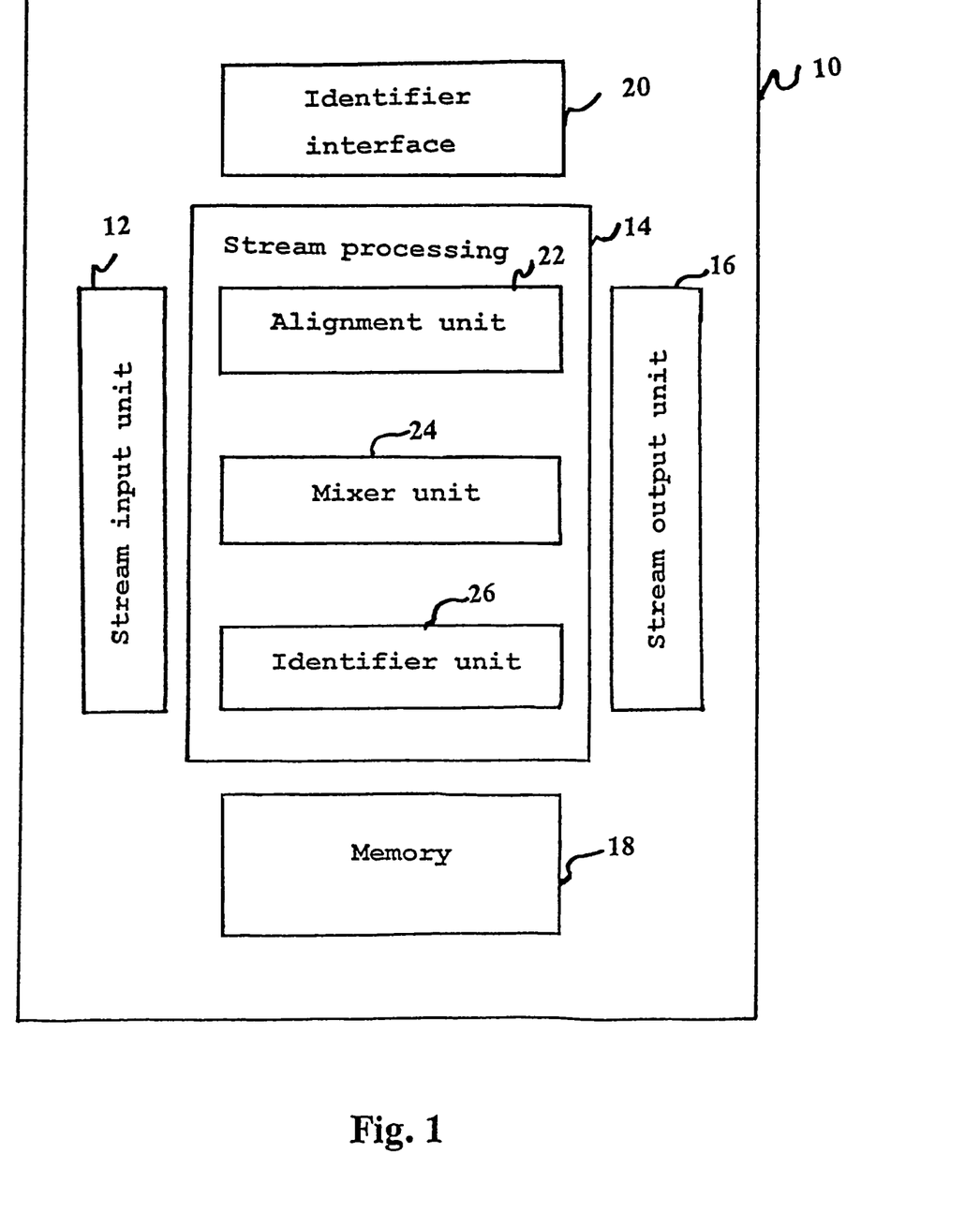
FIG. 1 shows a schematic diagram of a media stream mixer according to the present invention.

FIG. 1 shows a schematic diagram of a media stream mixer according to the present invention.

As shown in FIG. 1, the media stream mixer 10 comprises a stream input unit 12 adapted to receive at least one input media stream, a stream processing unit 14 generating a single output media stream from the at least one input media stream, and a stream output unit 16 for output of the generated mixed media stream.

Further, the media stream mixer 10 comprises a memory 18 and an interface unit 20 for exchange of identifier information to be used in the stream processing unit. The stream processing unit 14 comprises an alignment unit 22, a mixer unit 24, and an identifier unit 26. While in FIG. 1 the alignment unit is shown in relation to the stream processing unit 14, it should be noted that according to the present invention it is also possible to provide the alignment unit externally to the stream processing unit 14, e.g., in the stream input unit 12 or as stand-alone unit outside the media stream mixer.

Figure 2:
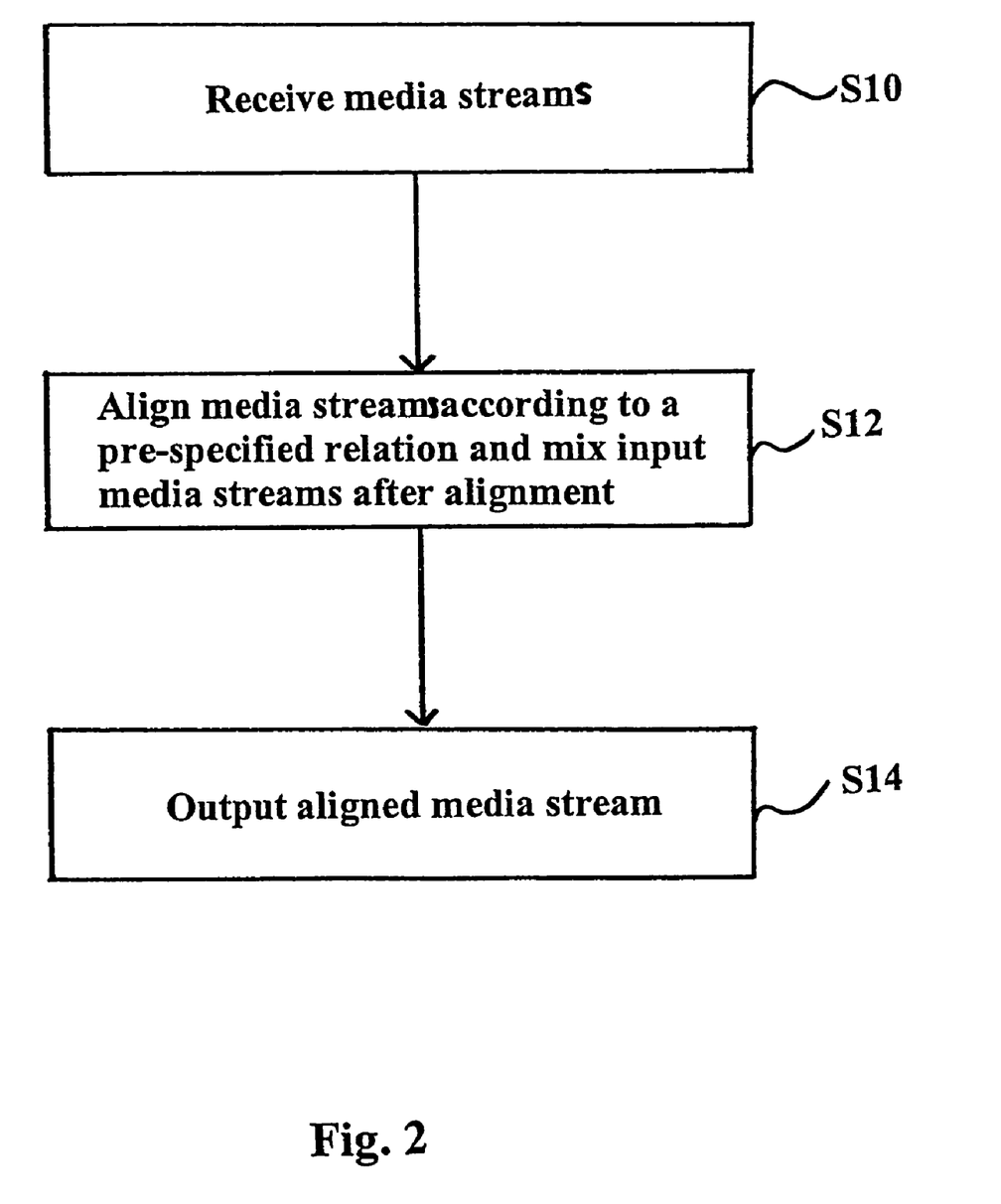
FIG. 2 shows a flowchart illustrating the operation of the media stream mixer according to the present invention.

FIG. 2 shows a flowchart illustrating the operation of the media stream mixer according to the present invention.

As shown in FIG. 2, in a first operation step S10 the media stream mixer will receive at least one input media stream of a pre-specified type. Then, in a step S12 the media stream mixer will align input media streams according to a pre-specified relation, and in a step S14 the media stream mixer will output the aligned media stream.

Heretofore, the stream processing unit 14 of the media stream mixer will exchange identifiers defining a pre-specified relation to be achieved for the input media stream before mixing thereof, by the identifier interface 20.

For comparison of a pre-specified relation of identifiers with the actual relation of identifiers in different input media streams, the stream processing unit 14 comprises the identifier unit 26 adapted to extract identifiers from input media streams.

The step of alignment S12 shown in FIG. 2 is achieved by the alignment unit 22 shown in FIG. 1, and the mixing of the input media streams of alignment is achieved by the mixer unit 24.

In the following, a more detailed explanation of the alignment of input media streams according to the present invention will be given with respect to FIGS. 3 and 4.

Figure 3:
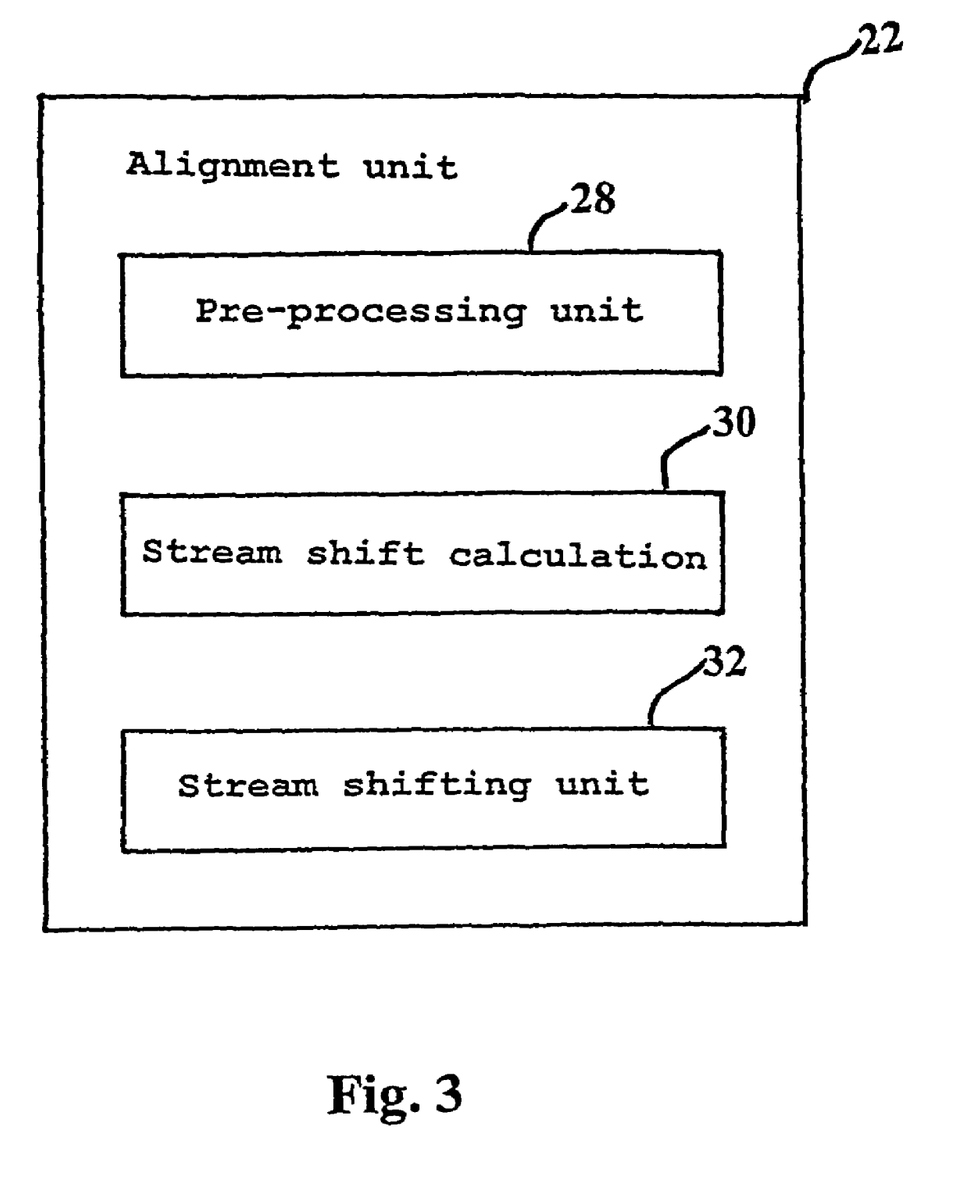
FIG. 3 shows a schematic diagram of the alignment unit shown in FIG. 1.

FIG. 3 shows a schematic diagram of the alignment unit 22 shown in FIG. 1. As shown in FIG. 3, the alignment unit comprises a pre-processing unit 28, a stream shift calculation unit 30 and a stream shift unit 32.

Operatively, the pre-processing unit 28 is adapted to identify which input media streams of the plurality of input media streams must be aligned according to a pre-specified relation.

The stream shift calculation unit 30 is adapted to determine a correct ordering of the sequence of input media streams. Further, once relevant input media streams are brought into a proper order, or in other words, into the same order as input media streams considered for defining the pre-specified relation between identifiers available in the master mixer—the stream shift calculation unit 30 will then proceed with the calculation of an appropriate shift to achieve the required alignment of input media streams in the stream shifting unit 32.

Finally, the stream shifting unit 32 will achieve an alignment of input media streams according to the result determined by the stream shift calculation unit 30, e.g., through intermediate storage of specific input media streams in the memory 18 of the media stream mixer 10.

Figure 4:
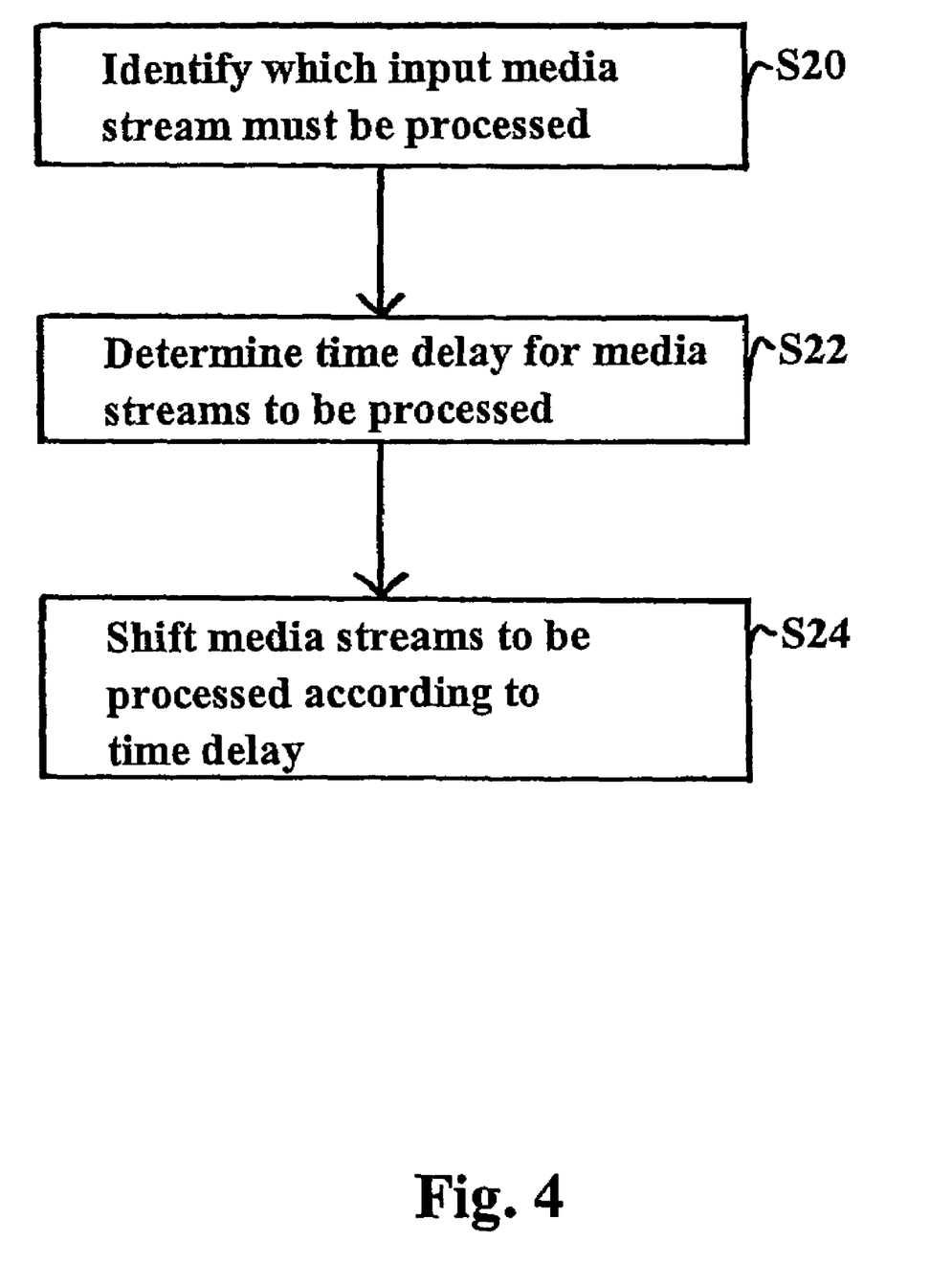
FIG. 4 shows a flowchart illustrating the operation of the alignment unit shown in FIG. 3.

The operation of the alignment unit shown in FIG. 3 may be summarized according to a flowchart illustrating the operation as shown in FIG. 4.

As shown in FIG. 4 the alignment unit 22 basically identifies which input media streams to the mixed media mixer must be processed in a step S20. Then, it determines an appropriate time delay with those media streams which have to be processed in a step S22. In a final step S22 it will shift media streams to be processed according to the determined time delay in a step S24, before subsequent mixing thereof.

In the following, the operation of the media stream mixer illustrated with respect to FIG. 1 to 4 will be described on the basis of a more formal notion.

Heretofore, it may be assumed that a first mixer is considered as a master mixer indicated with $\text{index}_M$ and a second mixer is considered as slave mixer indicated with $\text{index}_S$.

The set of media streams handled by the master mixer may be described through a set of tupel $s_i$, $i_i$, where $s_i$ relates to a number of each input media stream and $i_i$ relates to an identifier of this stream $s_i$ at a point in time which changes during operation on the set of input streams.

Similarly, for the slave mixer the set of input media streams at a point in time is described by a set of tupel the $q_i$ is related to the number of a specific input media stream and related $n_i$ is the identifier comprised in the input media stream at a point in time:

$$I_M = [(s_1, i_1), (s_2, i_2), \ldots, (s_m, i_m)]$$

$$I_S = [(q_1, n_1), (q_2, n_2), \ldots, (q_s, n_s)]$$

Here, one example may be that a master mixer operates on a set of input media streams 2, 4, 5, which at a point in time carry identifiers 1, 4, and 7. Further, for illustrating purposes one may assume that the slave mixer operates on a set of input media streams 2, 5, 4, 10 which at a point in time carry the identifiers 2, 1, 5, 2.

$$I_M = [(2,1), (4,4), (5,7)]$$

$$I_S = [(2,2), (5,1), (4,5), (10,2)]$$

In view of the examples given above, the present invention now considers how the ordering and time relationship between the different input media streams at the slave mixer may be modified such that they correspond to the ordering the time relationship between the input media streams and the master mixer.

Here, it should be clear that a modification of input media streams is only achievable in the slave mixer for those input media streams which have a counter part in the master mixer. Therefore, a first step is the determination of a subset of input media streams at the master mixer and slave mixer which are coincident according to $$S_A = \{s_1, s_2, \ldots, s_m\} \cap \{q_1, q_2, \ldots, q_s\}$$

For the particular example given above the result would be the input media streams having the number 2, 4, 5, respectively:

$$S_A = \{2, 4, 5\}$$

In view of the determined intersection of input media streams at the master mixer and the slave mixer, one may then modify the set of input media streams at the master mixer and the slave mixer to be in compliance with the intersection according to $$I'_M = \bigcup_{i \in [1, \ldots, m]} \{(s_i, i_i) | s_i \in S_A\}$$

$$I'_S = \bigcup_{j \in [1, \ldots, s]} \{(q_j, n_j) | q_j \in S_A\}$$

which for example leads to $$I_M' = [(2,1), (4,4), (5,7)]$$

$$I_S' = [(2,2), (5,1), (4,5)]$$

From the example one may see that not only the sequence of the input media streams must be considered, but also their ordering. This ordering is—according to the stream numbers—2, 4, and 5 for the master mixer, but 2, 5, 4 for the slave mixer. This implies that it is not possible to carry out an immediate consideration of identifiers of the input media streams at the master mixer and the slave mixer without appropriate modification of the input media stream ordering.

Such a modification may be represented by a permutation vector. Each element of the permutation vector expresses which input media stream to the master mixer corresponds to the which input media stream of the slave mixer according to $$\underset{i \in [1, \ldots, |I'_S|]}{\forall} \{p(i) = j \in [1, \ldots, |I'_S|] | s_i = q_j\}$$

For the specific example referred to above, the result is $$p = [1, 3, 2]$$

The different steps described so far in a formal manner and also in view of an example may be achieved in the pre-processing unit 28 shown in FIG. 3.

The further steps to be explained in the following are achieved by the stream shift calculation unit 30 also shown in this FIG. 3.

The first step to be achieved by the stream shift calculation unit 30 is to modify the set of input streams to the slave mixer according to the permutation vector derived as outlined above. In other words, the set of input media streams to the slave mixer is brought into an ordering according to the set of input media streams to the master mixer:

$$I_S'' = \emptyset$$

$$I_S'' = I_S'' \cup (q_{p(i)}, n_{p(i)}), i = 1, \ldots, |I'_S|$$

which for the example referred to above leads to $$I_S'' = [(2,2), (4,5), (5,1)]$$

One should note that the modification of the set of input streams to the slave mixer must not be implemented through actual re-ordering of input media streams at the input terminals of the slave mixer but may be achieved through indirect access to the input media streams using the permutation vector, as will be explained in the following.

Operatively, the stream shift calculation unit 30 determines each identifier in the input media streams to the master mixer and compares it with the related identifiers of input media streams to the slave mixer. The comparison is based on $$\delta_i = i_i - n_{p(i)}, i = 1, \ldots, |I'_S|$$

Here, the selection of the write input media stream at the slave mixer for comparison with the related input media stream to the master mixer is achieved through indirect access to the identifiers of the input media streams to the slave mixer using the permutation vector. For the specific examples given above, the result of this step will be $$\delta = [-1, -1, 6]$$

As can be seen from the above, there may be input media streams to the slave mixer which are either delayed or advanced in relation to the corresponding input media stream to the master mixer.

However, as the stream shift unit 32, explained in more detail in the following, may only delay input media streams at the slave mixer, one has to take care that the final alignment consists solely of delays of input media streams to the slave mixer.

According to the present invention, this is no problem as only a relative relation between input media streams must be maintained at the slave mixer in view of a relation of identifiers in input media streams at the master mixer without an absolute time scale.

Therefore, one will modify the delay vector generated through comparison of identifiers in the input media streams to the master mixer and the slave mixer according to $$\delta'_i = \delta_i - \max_{j \in [1, \ldots, |I'_S|]} \delta_j, i = 1, \ldots, |I'_S|$$

For the example referred to above, this leads to $$\delta' = [-7, -7, 0]$$

As can be seen, after this step only delays for the input media streams to the slave mixer occur. These delays are realized through intermediate storage of data packets comprised in each of the input media streams to the slave mixer.

In other words, the delay vector generated in the stream shift calculation unit 30 will be used by the stream shifting unit 32 such that the input media streams to the slave mixer are delayed according to $$q_{S_i}'(t) = q_{S_i}(t + \delta_i')$$

which for the example referred to above leads to $$q_2'(t) = q_2(t-7)$$

$$q_4'(t) = q_4(t-7)$$

$$q_5'(t) = q_5(t)$$

It should be noted that the formulas specified above may be modified in reversing the signs and the maximum operator to the minimum operator which would lead to the same result.

Figure 5:
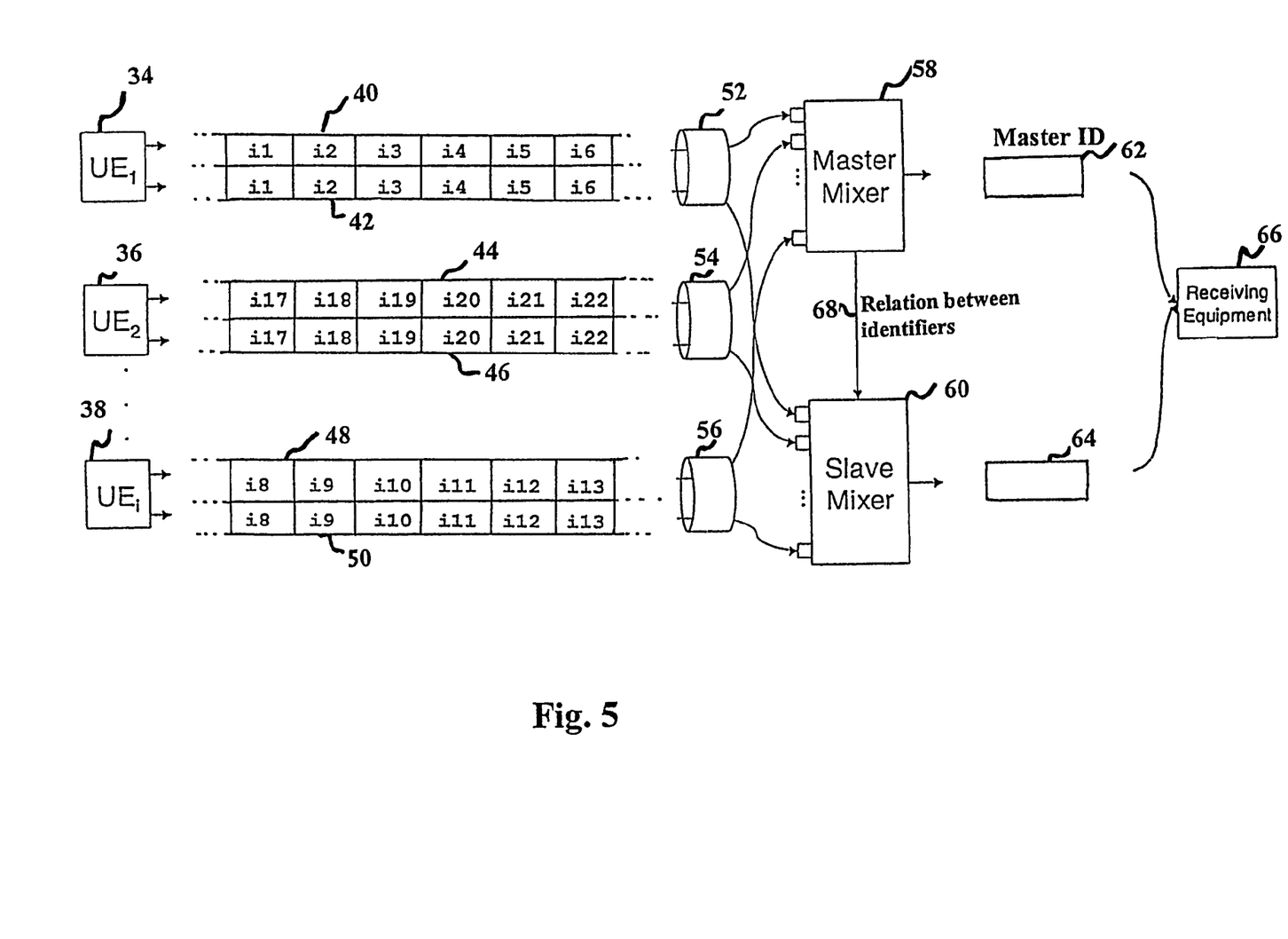
FIG. 5 shows a first example for the alignment of media streams according to the present invention.

FIG. 5 shows a first example for the alignment of media streams according to the present invention.

As shown in FIG. 5, according to a first example, three user end terminals 34, 36, and 38 generate simultaneously two types of media streams 40, 42, 44, 46, and 48, 50. Here, according to the example shown in FIG. 5, the media streams 40, 44, and 48 are of similar type, and also the media stream 42, 46, 50 may be of similar type. Similar media streams are supplied to a related mixer via splitters 52, 54, and 56.

In more detail, these splitters 52, 54, 56 submit the media streams 40, 44, 48 to a master mixer and the media streams 42, 46, 50 to a slave mixer 60. As outlined above, each master mixer 58 and slave mixer 60 generates a single output media stream 62 and 64 which may then be forwarded to the receiving equipment 66.

It should be noted that each such generated output media stream and the related data packets comprised therein are identified by a master ID.

According to the present invention, the relation between identifiers in input media streams at the master mixer 58—e.g., i6, i22, i13, and the master ID will then be forwarded at specific points in time—either periodically or not—to the slave mixer 60 via a signalling line. Although not shown in FIG. 5, an alternative mechanism for data exchange between the master mixer 58 and the slave mixer 60 may be a shared memory type communication.

Figure 6:
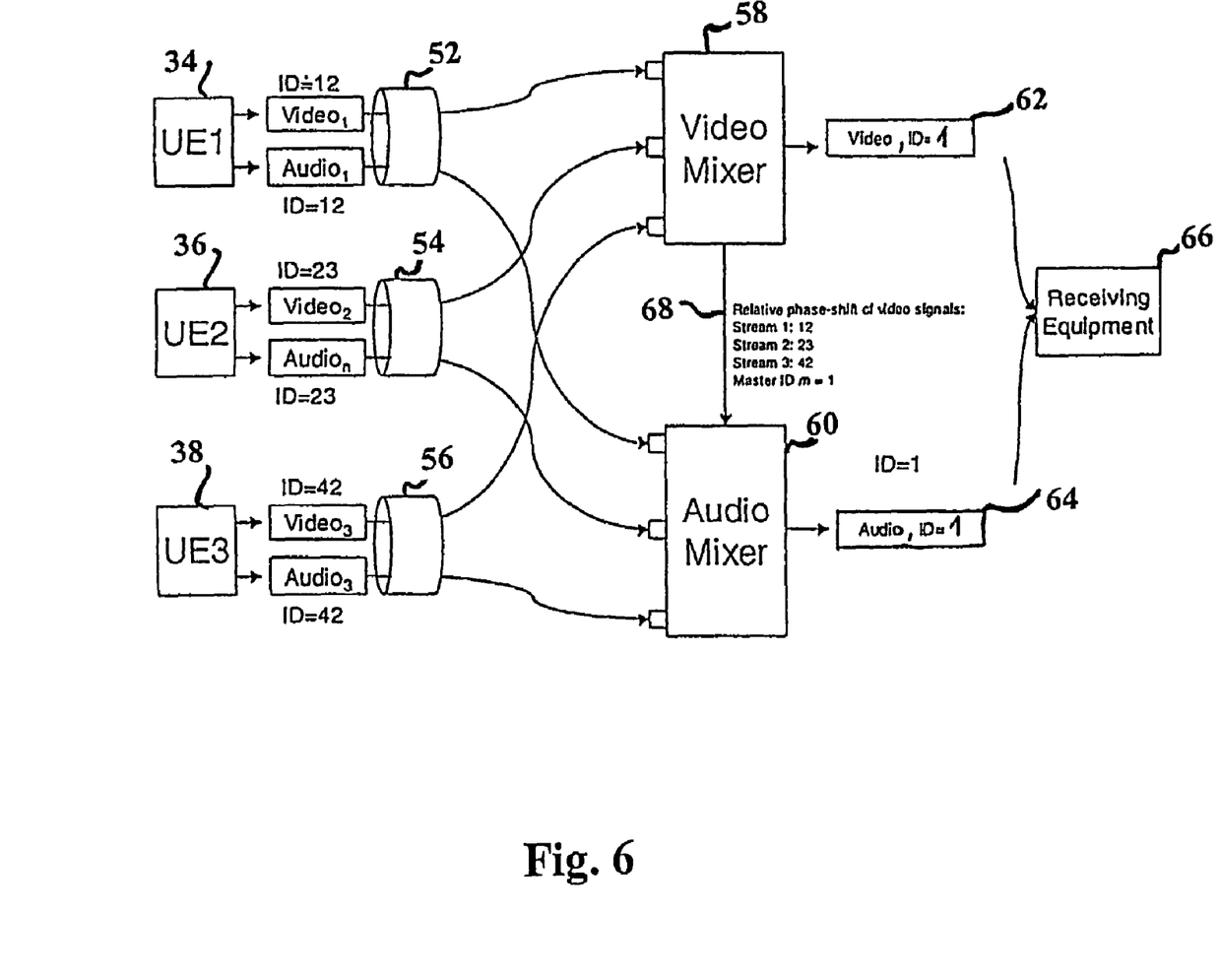
FIG. 6 shows a second example for the alignment of media streams according to the present invention.

FIG. 6 shows a second example of the alignment of media streams according to the present invention.

The example shown in FIG. 6 is similar to the example shown in FIG. 6, so that the same reference numerals are used to denote the same structural elements. In the example shown in FIG. 6, data packets of input media streams and output media streams are shown for one point in time.

According to the example shown in FIG. 6, each end user equipment 34, 36, 38 generates a video media stream and an audio media stream which are distributed via splitters 52, 54, 56 to a video mixer 58 operating as master mixer and an audio mixer operating as slave mixer.

The time relationship between the video input media streams and their related data packets at the point in time shown in FIG. 6 is (12, 23, 42) and is exchanged from the video mixer 58 to the audio mixer 60.

Further, the audio mixer will receive the master ID=1 of the data packet generated by the video mixer 58 for forwarding to the receiving equipment 66. The audio mixer 60 will receive the information from the video mixer and combine data packets having identifiers (12, 23, 42) also for the audio input media streams and generate a related output data packet under the same master ID.

Therefore, at the audio mixer not only the relative time relationship between data packets in video input media stream used at the video mixer is considered for generation of an output data packet of the audio type, but this output data packet is also characterized by the same master ID, so that at the receiving equipment 66, both the mixed video data packet and the mixed audio data packet are referenced under the correct master ID. Therefore, video display and audio display will be in proper time relationship.

Figure 7:
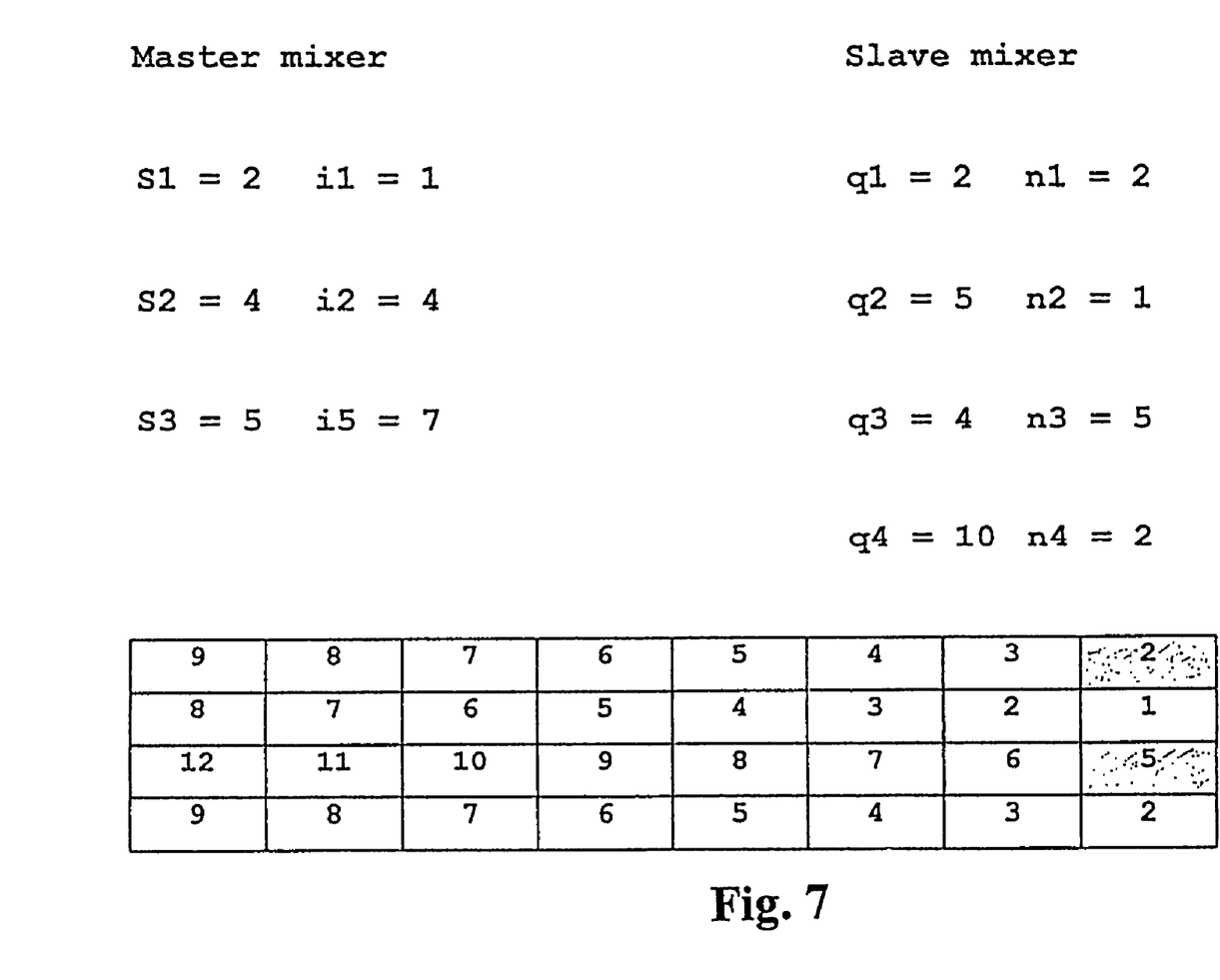
FIG. 7 shows a third example for the alignment of media streams according to the present invention.

FIG. 7 shows a third example of the alignment of the media streams according to the present invention.

The example shown in FIG. 7 is different over the previous examples in that the number of input media streams handled by the master mixer and the slave mixer is different. Further, the input media streams at the second and third input terminal of the master mixer and the slave mixer are interchanged. Finally, for this example it is assumed that also the mutual relation between input media streams at the master mixer is different from that of the slave mixer.

As shown in FIG. 7, to achieve the same relative relation between identifiers (1, 4, 7), also at the slave mixer it will be necessary to apply an intermediate storage for the input media streams supplied to input terminal q2 of the slave mixer. In other words, as shown on the right side of FIG. 7, at the slave mixer at input terminal 1 and 3, there are supplied input media streams 2, 4 according the input media streams supplied to the first and second input terminals of the master mixer.

Further, the difference between the related identifiers (5−2=3) is similar to those of the related input media streams at the master mixer (4−1=3).

However, the input media stream supplied to the second input terminal of the slave mixer, i.e. input media stream No. 5 corresponding to the input media stream supplied to the third input terminal of the master mixer is not aligned properly.

To achieve the correct alignment, as shown in the lower table of FIG. 7, the input media stream to the first and third terminal of the slave mixer—i.e. the input media stream with Nos. 2 and 4—should be supplied to an intermediate storage, while the processing of the input media stream to the second input terminal of the slave mixer is continued without delay.

After processing of seven such data packets being related to the input media stream to the second input terminal of the slave mixer, the related identifier in the input data packet will be (8). The difference between the input media stream being supplied to the second input terminal of the slave mixer and the input media stream being supplied to the third input terminal of the slave mixer will be (8−5=3). This difference is in compliance with the difference between identifiers in the input media streams supplied to the second and third input terminal of the master mixer (7−4=3).

At this instance of time, it is then possible to combine the buffered data packets of the input media streams with Nos. 2 and 4 and supplied to the first and third input terminal of the slave mixer with the input media streams being supplied to the second input terminal of the slave mixer and being processed without buffering, as shown with the shaded rectangles in FIG. 7.

According to the present invention, it is also suggested as option to maintain a relation of the input media stream supplied to the fourth input terminal of the slave mixer during subsequent processing of all input media streams to the slave mixer.

While above reference has been made to identifiers in input media streams, generally, examples of such identifiers could be time stamps or sequence numbers. Also, the exchange of a relation such identifiers from the master mixer to the slave mixer may be achieved periodically when sending a SYNC signal to slave mixers. Here, one may either send all identifiers being handled in the master mixer or information about an absolute identifier value and the relation of identifiers, e.g., ID1=x, ID2=ID1+y, ID3=ID+z, etc.

Further, the data exchange between the master mixer and the slave mixer has almost no delay requirement and the periocity may not be very high, assuming a reasonable low drift between the clock sources in the different mixers. The exchange signal, e.g., the SYNC signal, may be sent in different ways, as timing requirements are not very high. Example implementations would be out-band signalling, in-band signalling or via an operating system.

The invention claimed is:

1. A method, in a communication network, of generating a mixed media stream from different types of input media streams including audio, video and text, input media streams of a first type having payload data elements and related identifiers, respectively, comprising the step:

aligning the input media streams of the first type in an identifier interface unit, according to a pre-specified relation between identifiers in the input media streams of the first type before generating the mixed media stream, wherein the pre-specified relation between identifiers in the input media streams of the first type is matched, in an alignment unit, to a relation between identifiers in further input media streams of a second type used during generation of a further mixed media stream from the input media streams of the second type, wherein the matching of relations between identifiers in the input media streams of the first type and further input media streams of the second type is achieved by identifying an intersection in a pre-processing unit, between the input media streams of the first type and the further input media streams of the second type;

determining a relation between identifiers, using a calculation unit, in the further input media streams of the second type for those further input media streams which are comprised in the intersection;

aligning the input media streams of the first type using an aligning unit which are comprised in the intersection according to the relation of identifiers in the further input media streams of the second type, wherein the input media streams of the first type at a point in time are described by $I_s = [(q_1, n_1), (q_2, n_2), \ldots, (q_s, n_s)]$ with $\{q_1, q_2, \ldots, q_m\}$ as a set of input media streams and $\{n_1, n_2, \ldots, n_s\}$ as a set of identifiers in the input media streams at a point in time, the further input media streams of the second type at a point in time are described by $I_M = [(s_1, i_1), (s_2, i_2), \ldots, (s_m, i_m)]$ with $\{s_1, s_2, \ldots, s_m\}$ as a set of further input media streams and $\{i_1, i_2, \ldots, i_m\}$ as a set of identifiers in the further input media streams of the second type at the point in time, the intersection between the input media streams of the first type and the further input media streams of the second type is $S_A = \{s_1, s_2, \ldots, S_m\} \cap \{q_1, q_2, \ldots q_s\}$, and the relation between identifiers in the further input media streams of the second type for those further input media streams of the second type which are comprised in the intersection is determined by $$I'_S = \bigcup_{j \in [1, \ldots, s]} \{(q_j, n_j) | q_j \in S_A\}.$$

2. The method according to claim 1, further comprising the step of re-ordering the sequence of input media streams of the first type in the intersection according to the sequence of further input media streams of the second type in the intersection.

3. The method according to claim 1, wherein the re-ordering of the sequence of input media streams of the first type is achieved according to a permutation vector defined by $$\forall_{i \in [1, \ldots, I'_s]} \{p(i) = j \in [1, \ldots, |I'_s| | s_i = q_j\}.$$

4. The method according to claim 1, wherein the alignment of input media streams of the first type in the intersection is achieved by determining a relative time delay for each input media stream of the first type such that relations between different identifiers in the input media streams of the first type after time delay correspond to relations between identifiers in the further input media streams of the second type, and shifting each input media stream of the first type in time according to the related time delay.

5. The method according to claim 4, wherein the time delay for each input media stream of the first type is determined according to $$\delta_i = i_i - n_{p(i)}, i = 1, \ldots, |I'_s|$$

$$\delta'_i = \delta_i - \max_{j \in [1, \ldots, I'_s]} \delta_j, i = 1, \ldots, |I'_s|$$

and each input media stream of the first type is shifted in time according to $q_{Si}'(t) = q_{Si}(t + \delta_i'), i = 1, \ldots, |I_{S'}|.$ 6. The method according to claim 1, wherein an exchange of information regarding the pre-specified relation between identifiers is achieved through a signal transfer or a shared-memory mechanism.

7. An apparatus for generating a mixed media stream from different types of input media streams including audio, video and text, input media streams of a first type having payload data elements and related identifiers of a second type, comprising:

an identifier interface unit for exchange of a pre-specified relation between identifiers in different input media streams, and an alignment unit adapted to align the input media streams of the first type according to the pre-specified relation between identifiers in different input media streams of a second type before generating the mixed media stream, wherein the pre-specified relation is matched to a relation between identifiers in further input media streams of the second type used during generation of a further mixed media stream and that the matching of relations between identifiers in the input media streams of the first type and in the further input media streams of the second type is achieved by a pre-processing unit adapted to identify an intersection between the input media streams of the first type and the further input media streams of the second type, a calculation unit adapted to determine a relation between identifiers in the further input media streams of the second type for those further input media streams of the second type which are comprised in the intersection, and an aligning unit adapted to align the input media streams of the first type which are comprised in the intersection according to the relation of identifiers in the further input media streams of the second type, wherein the input media streams of the first type at a point in time are described by $I_s = [(q_1, n_1), (q_2, n_2), \ldots, (q_s, n_s)]$ with $\{q_1, q_2, \ldots, q_m\}$ as the set of input media streams of the first type and $\{n_1, n_2, \ldots, n_s\}$ as a set of identifiers in the input media streams of the first type at a point in time, the further input media streams of the second type at a point in time are described by $$I_M=[(s_1,i_1),(s_2,i_2),\ldots,(s_m,i_m)] \text{ with } \{s_1,s_2,\ldots,s_m\}$$

as a set of further input media streams of the second type and $\{i_1,i_2,\ldots,i_m\}$ as a set of identifiers in the further input media streams of the second type at the point in time, the pre-processing unit is adapted to determine the intersection between the input media streams of the first type and the further input media streams of the second type according to $$S_A=\{s_1,s_2,\ldots,s_m\}\cap\{q_1,q_2,\ldots,q_s\}, \text{ and}$$

the pre-processing unit is further adapted to determine the relation between identifiers in the further input media streams of the second type for those further input media streams of the first type which are comprised in the intersection on the basis of $$I'_S = \bigcup_{j\in[1,\ldots,s]} \{(q_j,n_j)|q_j \in S_A\}.$$

8. The apparatus according to claim 7 wherein the pre-processing unit is further adapted to re-order the sequence of input media streams of the first type in the intersection according to the sequence of further input media streams of the second type in the intersection.

9. The apparatus according to claim 8, wherein the pre-processing unit is adapted to re-order the sequence of input media streams of the first type according to a permutation vector defined by $$\forall_{i\in[1\ldots,I'_S]} \{p(i)=j \in [1,\ldots,|I'_S|]|s_i=q_j\}.$$

10. The apparatus according to claim 7, wherein the alignment of input media streams of the first type in the intersection is achieved by the calculation unit adapted to determine a relative time delay for each input media stream of the first type such that relations between different identifiers in the input media steams of the first type, after time delay, correspond to relations between identifiers in the further input media streams of the second type, and a shifting unit adapted to shift each input media stream of the first type in time according to the related time delay.

11. The apparatus according to claim 10, the calculation unit is adapted to calculate the time delay for each input media stream of the first type according to $$\delta_i = i_i - n_{p(i)}, i=1,\ldots,|I'_s|$$

$$\delta'_i = \delta_i - \max_{j\in[1\ldots,I'_s]} \delta_j, i=1,\ldots,|I'_s|$$

and the shifting unit is adapted to shift each input media stream of the first type in time according to $$q_{Si}'(t)=q_{Si}(t+\delta_i'), i=1,\ldots,|I_S'|.$$

* * * * *

UNITED STATES PATENT AND TRADEMARK OFFICE
CERTIFICATE OF CORRECTION

PATENT NO.       : 7,570,665 B2
APPLICATION NO.  : 10/517721
DATED            : August 4, 2009
INVENTOR(S)      : Ertel et al.

It is certified that error appears in the above-identified patent and that said Letters Patent is hereby corrected as shown below:

In Column 2, Line 14, after "consider a" insert -- tupel --.

In Column 10, Line 56, delete "periocity" and insert -- periodicity --, therefor.

In Column 14, Line 27, in Claim 11, in Equation, delete " $j \in [1 \ldots , l'_s]$ " and insert -- $j \in [1 \ldots , l_s']$ --, therefor.

Signed and Sealed this

Eighteenth Day of May, 2010

David J. Kappos
*Director of the United States Patent and Trademark Office*